Sept. 2, 1952          D. E. SHARP          2,608,798

METHOD AND APPARATUS FOR PRODUCING SHEET GLASS

Filed Aug. 20, 1945          2 SHEETS—SHEET 1

Inventor
DONALD E. SHARP.
By Frank Fraser
Attorney

Sept. 2, 1952 D. E. SHARP 2,608,798
METHOD AND APPARATUS FOR PRODUCING SHEET GLASS
Filed Aug. 20, 1945 2 SHEETS—SHEET 2
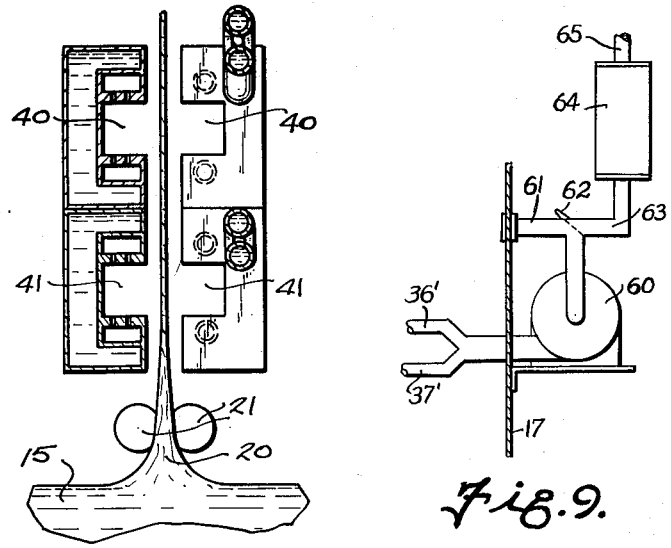
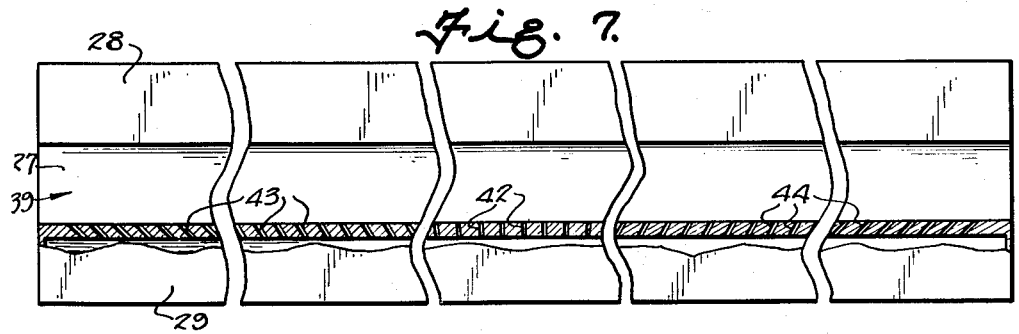
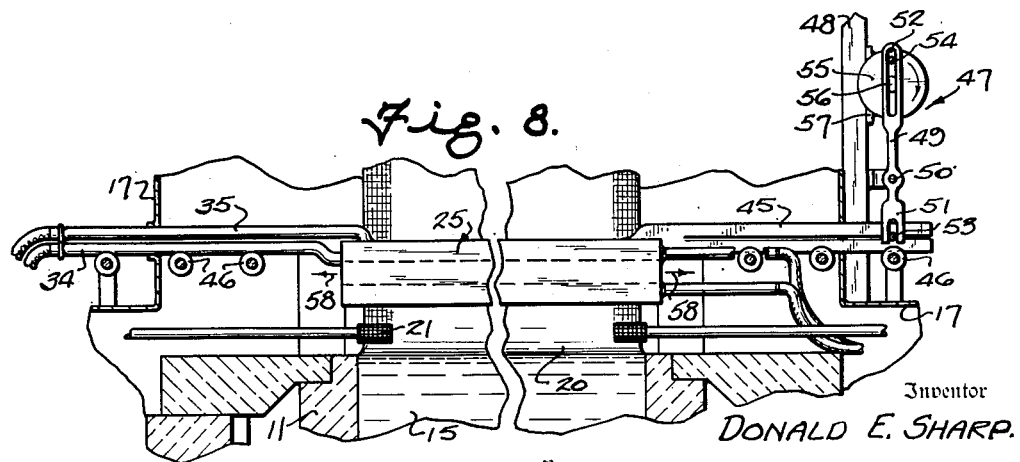
Inventor
DONALD E. SHARP.
By Frank Fraser
Attorney Patented Sept. 2, 1952

2,608,798

UNITED STATES PATENT OFFICE 2,608,798

METHOD AND APPARATUS FOR PRODUCING SHEET GLASS

Donald E. Sharp, Toledo, Ohio, assignor to Libbey-Owens-Ford Glass Company, Toledo, Ohio, a corporation of Ohio Application August 20, 1945, Serial No. 611,530

11 Claims. (Cl. 49—17)

1

The present invention relates to the production of flat drawn glass, and more particularly to a novel way of treating and conditioning such glass while it is in its formative stage and in the process of being drawn into permanent shape.

Primarily, the invention has to do with that type of flat glass generally referred to in the trade as "sheet" glass or "window" glass, and which is produced with natural fire finished surfaces; as distinguished from "plate" glass which has surfaces that are mechanically ground and polished.

There are several different types of machines on which flat drawn sheet glass is produced today, but in all of them a ribbon or sheet of glass is continuously drawn upwardly from a molten bath, contained in a working receptacle, which is supplied from a tank furnace.

Because sheet or window glass is drawn into final finished form directly from a bath of molten glass it can be produced much more simply and cheaply than ground and polished plate glass. For the same reason, however, it is liable to a number of defects that, in the past, have come to be considered more or less characteristic of flat glass produced in this manner. Among these are: lack of uniform thickness, and the presence of waves, slight distortion, streaks, and similar body and surface imperfections.

It is an aim of this invention to produce sheet glass of greatly improved quality, and in which the defects mentioned above are reduced to a minimum if not entirely eliminated, on regular sheet glass drawing machines.

Another object is to substantially increase the speed at which continuous glass sheets of given thicknesses can be drawn from a mass of molten glass in such machines.

A further object of the invention is to accomplish the above aims by protecting the glass in the sheet being drawn from the natural atmospheric conditions in the zone of sheet formation, and by subjecting it to a special conditioning procedure while it is still in its formative state.

Another object is the provision of a novel method of regulating the temperature and movement of the air and gases in the atmosphere surrounding the newly formed sheet, which involves reversing their natural flow across the sheet by the use of controlled streams of conditioned air moving counter thereto.

Another object is provision of a special conditioning apparatus for the purpose which includes a new type of combined air and water cooler or heat exchanger.

Still another object is the provision of means for continuously moving these heat exchangers within the plane of the sheet in a manner to break up any spot or line cooling pattern and to insure a more uniform and complete cooling action.

Other objects and advantages of the invention

2 will become more apparent during the course of the following description, when taken in connection with the accompanying drawings.

In the drawings, wherein like numerals are employed to designate like parts throughout the same:

Fig. 6 is an end view, partially in section, of a double cooler arrangement, showing its relation to a glass sheet being drawn;

Fig. 7 is a front view partially in section of one of the coolers, showing a different arrangement of air openings;

Fig. 8 is a view similar to Fig. 2, showing mechanism for imparting reciprocating movement to the coolers; and Fig. 9 is a diagrammatic showing of the manner of supplying air to the coolers.

Figure 1:
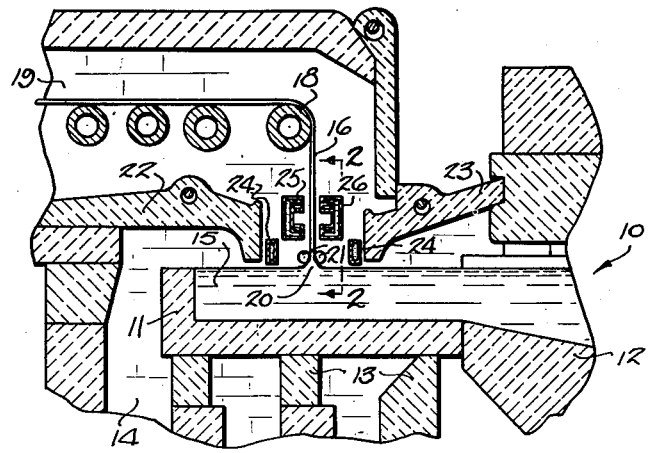
Fig. 1 is a longitudinal, vertical section through the drawing chamber and associated parts of a sheet glass drawing machine of the Colburn type.
Figure 2:
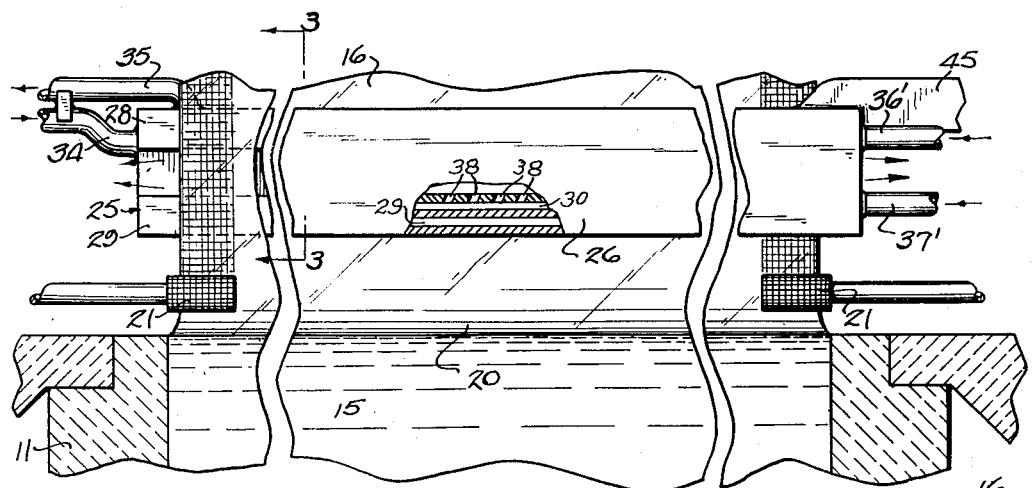
Fig. 2 is a section on an enlarged scale taken substantially on the line 2—2 in Fig. 1.

The method and apparatus of this invention are applicable to any of the well known sheet glass forming machines. As pointed out above the particular machine illustrated in the drawing is of the Colburn type, but it will be understood that the control of the air and temperature in the area of sheet formation of the other kinds of machines involves similar problems, and that they can be solved in the same way.

Referring now more particularly to the drawings, the numeral 10 in Fig. 1 designates the working end of a glass tank furnace, and includes a working receptacle or pot 11 that is supplied with properly conditioned molten glass through a cooling chamber 12. The draw pot 10 is mounted on stools 13 in a pot chamber 14, and heated by suitable gas burners or the like (not shown) to maintain the bath of molten glass 15 therein at the desired working temperature.

When in operation, a ribbon or sheet of glass 16 is continuously drawn from the bath 15. It is a characteristic of the Colburn type machine that the glass ribbon 16 is drawn initially in a vertical plane and is then bent at right angles over an internally cooled bending roll 18 so that it can be then carried horizontally through a flattening chamber 19 and an annealing leer (not shown), before being finally cut up into individual sheets.

Figure 3:
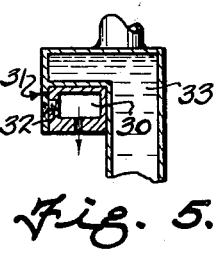
Fig. 3 is a sectional view of one of the coolers and the glass sheet, taken substantially on the line 3—3 in Fig. 2.

In drawing the glass sheet from the molten bath, a meniscus or enlarged base portion 20 is created adjacent the source and the final thickness is not arrived at until the sheet has been pulled for some distance above the surface of the molten bath. This is best shown in Figs. 1, 3 and 6. In order to hold the sheet to width, its natural tendency to narrow laterally during its formative period is counteracted by pairs of driven, internally cooled knurled edge holding devices 21, mounted to operate in the border portions of the meniscus at a speed that is slightly less than that of the travel of the sheet.

Lip-tiles 22 and 23 and lip-tile coolers 24 are of the standard type used on Colburn machines and are positioned to protect the newly formed sheet from the heated air and gases in the furnace and pot chamber. The coolers 24 also serve to further condition the molten glass moving thereunder, by reducing the temperature of the glass surface just before it is drawn into the sheet.

The area or zone of the machine that lies directly above the surface of the molten glass between the faces of the two lip-tiles 22 and 23 is referred to herein as the zone of sheet formation. Within this zone is the exposed surface of the molten glass in the draw pot, the meniscus of the emerging sheet and the glass sheet itself, in its formative and most critical stage. The bending roll 18, in the Colburn type machine pictured in the drawings, is positioned just beyond the true forming area, so that by the time the glass ribbon reaches this point it is set sufficiently to be bent over the roll without marring its contacting face, provided of course that the surfaces of the bending roll and of the sheet itself are smooth and clean.

Now the temperature and atmospheric conditions that surround the glass ribbon or sheet in this zone of sheet formation exert a very considerable influence on the uniformity of thickness, flatness and surface quality of the finished product in any sheet glass machine.

In the first place the average thickness of the glass sheet that is drawn from a bath of molten glass is determined chiefly by (1) the viscosity of the glass, and (2) the speed at which the sheet is drawn. Since the viscosity of the glass is dependent on its temperature, it will be readily apparent that variations in temperature in the forming zone will tend to produce non-uniform thicknesses of sheet. Furthermore, since the glass ribbon is quite soft and plastic in its formative stage, any dirt or other foreign matter contained in the surrounding air and settling on the glass may result in serious surface defects.

These might be termed the direct effects of the atmospheric conditions around and in contact with the forming sheet, but the influence is also felt in other ways. For example, the presence of different temperatures at different points across the rising sheet causes thick and thin streaks in the formed ribbon. To explain, the glass sheet being formed is quite thick at its base or meniscus but pulls progressively thinner as it moves upward until it loses plasticity and attains its final thickness some distance above the molten bath. For this reason, in areas where cold air strikes the unset glass, it will chill or set up more rapidly and so will be thicker at this point in the finished sheet. On the other hand areas that are subjected to excessive heat will continue to attenuate and grow thinner beyond the normal setting up point.

Unfortunately, the atmospheric conditions that naturally exist in the drawing chamber of a conventional sheet glass machine seriously interfere with attempts to maintain uniform temperatures and clean controlled air conditions therein. Thus, there is always a certain amount of stack effect within the zone of sheet formation which draws relatively cold air in from beyond the edges of the newly formed sheet. This incoming air passes inwardly toward the center, rising continually as it heats up and expands, and so sets up a continuous movement of air that varies progressively in temperature from the edges to the middle of the glass sheet. Added to this are the natural convection currents that occur in the vicinity of the hot sheet and which create further uncontrolled turbulence in the atmosphere immediately surrounding the glass ribbon as it emerges from the molten bath. Incidentially, this atmosphere is made up not only of air, but of various gases and products of combustion as well.

Many attempts have heretofore been made to reduce these undesirable atmospheric conditions within the drawing chamber, and probably the best results have been attained so far by enclosing the machine as completely as possible from the outside atmosphere as indicated at 17 in Fig. 8. The chief difficulty with this type of corrective measure, however, is that it acts only toward the reduction of the undesirable conditions, rather than toward their positive elimination. There is always a considerable infiltration of relatively cold air into the machine enclosure and this air not only flows into and through the forming zone in the manner set forth above, but also brings in dust and other particles which may embed themselves in the soft glass to cause permanent surface defects, or may lodge upon rolls with which the sheet comes in contact and cause scratching, digs and so forth.

According to my invention, on the other hand, the effects of the undesirable air currents and temperature differentials in the zone or area of sheet formation are counteracted, and so actually overcome, by: (1) setting up new and controlled movements of air flowing from the center of the newly formed sheet outwardly toward its opposite edges; and (2) positively and uniformly cooling the glass ribbon in this way, across its entire width, at the critical points in its formation.

A preferred embodiment of the apparatus designed to carry out my invention is illustrated in Figs. 1 to 4 of the drawings. As shown there, the conditioning apparatus comprises a pair of oppositely disposed heat exchangers or coolers 25 and 26, arranged one on either side of the sheet 16 being drawn, and slightly above the surface of the molten bath 15. I prefer to position these coolers about as shown in Fig. 1, but it may be necessary to raise or lower them relative to the molten bath 15, or to space them closer to or farther away from the sheet 16, depending on the temperatures encountered in the drawing chamber, the particular atmospheric conditions that may exist therein, the thickness of the sheet being drawn and so forth.

Figure 5:
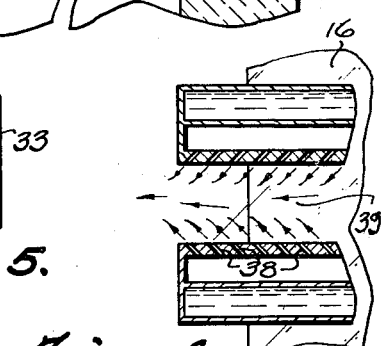
Fig. 5 is a fragmentary view of a modified form of cooler.

The coolers 25 and 26 are slightly longer than the glass sheet is wide (Figs. 2 and 4), and substantially channel-shaped in cross section with the open portion of the two channels facing each other (Figs. 1 and 3). Differently stated, they are each made up of a rectangular portion 27 (Fig. 3), resembling an ordinary vertical type water cooler, and a pair of lateral rectangular flanges 28 and 29 extending in the direction of the sheet 16 from the upper and lower ends respectively of the portion 27. Immediately adjacent the bottom of each flange 28 and the top of each flange 29 are a pair of longitudinally extending air compartments 30 coextensive therewith. These air compartments may be formed integral with the main body portion of the cooler as shown in Fig. 3 or they may be formed separately and secured to the main body portion in any suitable manner. For example, they may fit into a special channel 31 and be secured in place by machine screws 32, as illustrated in Fig. 5.

Figure 4:
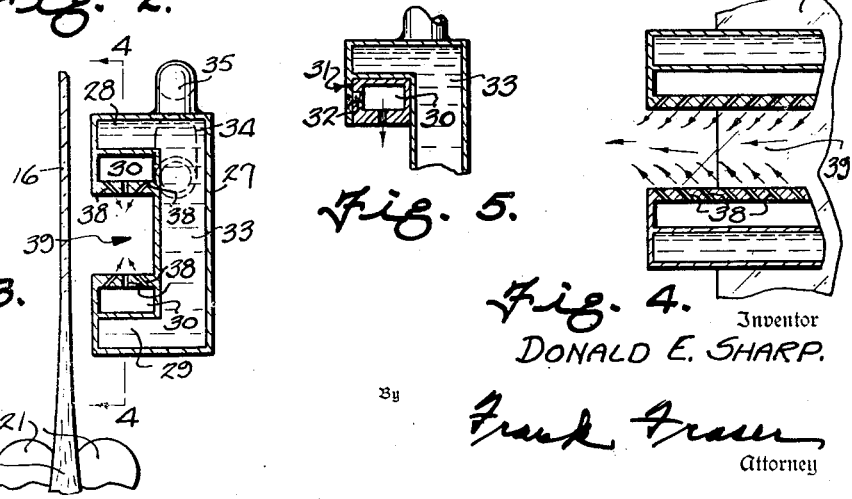
Fig. 4 is a fragmentary sectional view of the end of the cooler of Fig. 3, taken substantially on the line 4—4 of Fig. 3.

Water or other cooling liquid 33 is introduced into and circulated through the portions 27 and the flanges 28 and 29 connected therewith by means of supply and outlet pipes 34 and 35, while low pressure air is fed into the air compartments 30, through conduits 36' and 37', and discharged through the openings 38. Beginning in the middle of each of the coolers 25 and 26, the openings 38 in the air compartments that are at one side of the center line of the glass sheet angle toward the edges of the sheet on that side of the line, as shown in Fig. 4, while the openings that are on the other side of the center line of the sheet will angle toward its opposite edge. In this way the air that is blown or blows out through the openings 38 will move in a reverse direction from the natural flow of air in the sheet forming zone or, in other words, from the center outwardly toward the edges of the glass sheet.

I prefer to use a plurality of rows of openings 38, leading from the air compartments 30, which may be angled laterally as well as longitudinally as indicated in Fig. 3. However, a single row, and openings angled only in the direction of the length of the coolers, as shown in Fig. 5, will also give good results. The temperature of the air flowing out of the air compartments and, as a stream of substantially predetermined width, through the open channel 39 of the coolers, can be controlled by regulating the temperature of the water circulated through the portion 27 and flanges 28 and 29. In turn this controls the temperature of the glass sheet in the area opposite the coolers where it is contacted by the stream of air flowing through the channels 39.

One advantage of creating the flow of air within the zone of sheet formation by this particular means is that the additional jets of air that are being continuously injected into the moving air stream through the openings 38 serve to renew the air within the stream and thus maintain a uniform temperature in spite of continued absorption of heat from the glass sheet into the air stream during its travel.

By careful control of the air pressures and temperatures, the glass sheet 16 in the zone of sheet formation will be drawn through a slowly moving blanket of tempered air flowing from the middle of the sheet outwardly toward its opposite edges. In this way spotty and irregular heat loss from, and hot and cold streaks in the sheet, will be substantially eliminated by a positive and uniform cooling of the glass across its entire width during its critical formative period.

At the same time this controlled flow of air, traveling against the direction of natural air flow in this area, will counteract the tendency of the normal stack effect in the chamber to draw relatively cold air in from the edges and across the face of the rising sheet. Consequently it is possible, on a window glass machine equipped with the conditioning apparatus of this invention, to produce sheet glass of a superior quality and of a smoothness, flatness, equality of thickness and freedom from defects that compares quite favorably with polished plate glass.

Ordinarily a pair of coolers 25 and 26 are used, mounted symmetrically one on each side of the path of travel of the sheet and in horizontal alignment with one another. However, this is not absolutely essential and other arrangements may give better results in some cases, or a cooler on one side of the sheet only may be sufficient for some purposes. Moreover, the air speed and air temperature may be different in the cooler on one side of the sheet than on the other to obtain the desired conditions in the forming zone. But in all cases it is important that the controls or adjustments be operated with the idea in mind of setting up and maintaining a uniform temperature in the glass sheet across its entire width.

In order to condition a larger area surrounding the glass sheet being drawn, it is sometimes desirable to use double or duplicate coolers arranged one above the other as shown in Fig. 6. In this particluar case there are really four coolers involved and since each of them can be controlled independently, a somewhat wider range of adjustment is possible than with two coolers. For example, temperatures may be made to vary gradually between the upper and lower cooler; and, instead of flowing air from the center outwardly to the opposite edges, with this arrangement the air may flow from one side of the sheet to the other in each of the channels 40 and 41, flowing in one direction in one channel and in the opposite direction in the other.

In Fig. 7 there has been illustrated a different arrangement of air openings in the air compartment of the coolers. With the set-up of Fig. 4 all of the openings 38 have the same degree of angularity, the ones on one side of the center line angling in one direction and those on the other side in the other. In the cooler of Fig. 7, however, provision is made for a more uniform air flow by using substantially vertical openings 42 adjacent the middle of the cooler and opposite the centerline of the sheet, and angled openings 43 and 44 on either side of these vertical ones, which angled openings increase progressively in angularity as they approach the ends of the coolers.

In order to obviate any possibility of obtaining an open patterned cooling effect on the glass due to the jet-like form of the air flowing from the openings in the air compartment, and to further equalize the cooling action, there is provided in Fig. 8 a mechanism for creating a continuous movement of the coolers to break up any tendency toward spot, line or pattern cooling.

Regardless of whether they are movably mounted or not, the coolers 25 and 26 are usually supported at one end by means of their water pipes 34 and 35 and at the other end by arms or the like 45. When, as shown here, these pipes and arms are carried on grooved rollers 46 the coolers 25 and 26 will be free to move back and forth in a plane parallel to the glass ribbon 16. To effect such movement, a reciprocating mechanism, designated in its entirety by the numeral 47, may be mounted on a vertical support 48 outside the machine. As shown the device includes an arm 49 pivoted intermediate its ends as at 50 and having a forked member 51 at one end, and a slotted portion 52 at the other. The forked portion 51 embraces pins 53 extending laterally from between the arms 45 while a pin 54 on the face of a cam plate 55, carried by the drive shaft 56 of a motor 57, rides in the slotted portion 52 of the arm 49. Upon rotation of the drive shaft the coolers 25 and 26 on either side of the sheet 16 will be reciprocated continuously back and forth to break up and equalize the cooling pattern of the air issuing therefrom. Other than this, the action of the device is the same as that of Figs. 1 to 4, the air flowing out of the opposite ends of the coolers as indicated by the arrows 58.

In some respects it is desirable to circulate the air that is already in the machines rather than to introduce fresh air from the outside, so as to maintain a balance of air in the drawing chamber. In this case the air supply conduits 36' and 37' (Figs. 2 and 9) can be fed from a blower 60 which draws air from the interior of the chamber through a conduit 61, when the valve 62 is in the position shown in Fig. 9. If fresh outside air is used it should be conditioned as to temperature and so forth before being supplied to the coolers. This may be done by turning the valve 62 through 90° to cause the blower 60 to feed air to the air supply conduits 36' and 37' from the conduit 63. The conduit 63 is connected to an air conditioner, shown diagrammatically at 64 which is supplied with outside air by means of a conduit 65. In some instances the introduction of additional air is desirable in that it builds up an atmospheric pressure within the chamber that is slightly greater than the outside atmosphere and thus discourages the infiltration of relatively cold air.

As stated above, I prefer to supply what I term low pressure air to the air compartments 36 and 37. However, the exact pressure at which the air should issue from the openings will be determined by the temperature of the air itself, the amount of cooling action desired and the exact character and extent of the adverse air currents to be overcome. In any event, however, the air is literally blown outwardly from the middle of the glass sheet toward its opposite edges and provides a moving blanket of air of controlled temperature and velocity which at the same time protects and conditions the glass sheet in its formative state.

Not only can the glass sheet be cooled more uniformly in this manner, but it can also be cooled faster without injurious effects. For this reason, glass sheets of any given thickness can be drawn from the mass of molten glass at a higher rate of speed than would otherwise be possible. This makes for greater production from the machines, and a further increase can be effected because the uniform conditioning makes it possible to draw wider sheets.

Although this invention has been described only in connection with the production of sheet or window glass, it may also prove valuable in drawing continuous sheets to be used for plate glass blanks of such quality as to require a very minimum of grinding and polishing.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. The combination, in apparatus for producing sheet glass, of a receptacle adapted to be continuously supplied with a bath of molten glass, means for drawing a sheet or ribbon of glass from said bath, and means defining a zone of sheet formation, with means for establishing and maintaining within said zone controlled flows of air which move from a point adjacent the center line of the sheet being drawn toward the edges thereof comprising, a pair of air compartments arranged in spaced relation to one another substantially equidistant from the sheet being drawn and having air discharge openings at both sides of the longitudinal center line of the sheet and leading from said compartments in a direction away from the center line of the sheet and toward the openings in the other compartment, and means for supplying air under pressure to said compartments.

2. The combination, in apparatus for producing sheet glass, of a receptacle adapted to be continuously supplied with a bath of molten glass, means for drawing a sheet or ribbon of glass from said bath, and means defining a zone of sheet formation, with means for establishing and maintaining within said zone controlled flows of air which move from a point adjacent the center line of the sheet being drawn toward the edges thereof comprising, a pair of air compartments arranged in spaced relation to one another substantially equidistant from the sheet being drawn and having air discharge openings at both sides of the longitudinal center line of the sheet and leading from said compartments in a direction away from the center line of the sheet and toward the openings in the other compartment, means for supplying air under pressure to said compartments, and means associated with each compartment for controlling the temperature of the air flowing therethrough.

3. The combination, in apparatus for producing sheet glass, of a receptacle adapted to be continuously supplied with a bath of molten glass, means for drawing a sheet or ribbon of glass from said bath, and means defining a zone of sheet formation, with means for establishing and maintaining within said zone controlled flows of air which move from a point adjacent the center line of the sheet being drawn toward the edges thereof comprising, a pair of air compartments arranged in spaced relation to one another substantially equidistant from the surface of the sheet being drawn and extending thereacross, each of said compartments having air discharge openings at both sides of the longitudinal center line of the sheet and leading from said compartments in the direction of the other compartment and away from the center line of said sheet with the degree of angularity of said openings away from the center line of the sheet increasing as their distance from said center line increases, and means for supplying air under pressure to said compartments.

4. The combination, in apparatus for producing sheet glass, of a receptacle adapted to be continuously supplied with a bath of molten glass, means for drawing a sheet or ribbon of glass from said bath, and means defining a zone of sheet formation, with means for establishing and maintaining within said zone controlled flows of air which move from a point adjacent the center line of the sheet being drawn toward the edges thereof comprising, a pair of air compartments arranged in spaced relation to one another substantially equidistant from the sheet being drawn and having air discharge openings at both sides of the longitudinal center line of the sheet and leading from said compartments in a direction away from the center line of the sheet and toward the openings in the other compartment, means for supplying air under pressure to said compartments, and means for continuously moving said air compartments in the plane of said sheet.

5. The combination, in apparatus for producing sheet glass, of a receptacle adapted to be continuously supplied with a bath of molten glass, means for drawing a sheet or ribbon of glass from said bath, and means defining a zone of sheet formation, with means for establishing and maintaining within said zone controlled flows of air which move from a point adjacent the center line of the sheet being drawn toward the edges thereof comprising, a pair of air compartments arranged in spaced relation to one another substantially equidistant from the sheet being drawn and having air discharge openings at both sides of the longitudinal center line of the sheet and leading from said compartments in a direction away from the center line of the sheet and toward the openings in the other compartment, means for supplying air under pressure to said compartments, and means associated with each compartment for controlling the temperature of the air flowing therethrough comprising a heat exchanger surrounding each of said compartments on two sides and extending therebetween.

6. The combination, in apparatus for producing sheet glass, of a receptacle adapted to be continuously supplied with a bath of molten glass, means for drawing a sheet or ribbon of glass from said bath, and means defining a zone of sheet formation, with means for establishing and maintaining within said zone controlled flows of air which move from a point adjacent the center line of the sheet being drawn toward the edges thereof comprising, a pair of air compartments on each side of the sheet being drawn arranged in spaced relation to one another and extending across the width of said sheet, said air compartments having air discharge openings at both sides of the longitudinal center line of the sheet and leading from said compartments in a direction away from the center line of the sheet and toward the other compartment of the pair, a cooler associated with each of said pairs of compartments surrounding both compartments of the pair on two sides and extending therebetween on the side remote from the sheet, means for supplying air under pressure to said compartments, and means for supplying a cooling medium to said coolers.

7. A sheet glass cooler comprising a channel shaped casing adapted to be supplied with a cooling medium, a pair of spaced compartments associated with said casing and partially surrounded thereby, said compartments being adapted to receive a gaseous cooling medium and having openings at both sides of the longitudinal center line of said cooler and leading from said compartments that are angled away from a transverse center line of the cooler and toward one of its ends.

8. A method of producing sheet glass comprising, drawing a ribbon or sheet from a bath of molten glass through a zone of sheet formation, setting up substantially confined streams of blown air of definite width in direct contact with and blanketing a portion of the sheet and traveling laterally of the sheet through the zone of sheet formation along paths substantially parallel with the sheet being drawn from a point opposite the approximate center line of said sheet toward its opposite edges, and maintaining said streams by blowing jets of air thereinto at spaced intervals across the width of the sheet and at an angle away from the center line of the sheet.

9. A method of producing sheet glass comprising, drawing a ribbon or sheet from a bath of molten glass through a zone of sheet formation, setting up substantially confined streams of blown air of definite width in direct contact with and blanketing a portion of the sheet and traveling at right angles to the sheet through the zone of sheet formation along paths substantially parallel with the sheet being drawn from a point opposite the approximate center line of said sheet toward its opposite edges, maintaining said streams by blowing jets of air thereinto at an angle away from the center line of the sheet and at spaced intervals across the width of the sheet, and controlling the temperature of said air streams along said paths.

10. A method of producing sheet glass comprising, drawing a ribbon or sheet from a bath of molten glass through a zone of sheet formation, setting up substantially confined streams of blown air of definite width in direct contact with and blanketing a portion of the sheet and traveling laterally through the zone of sheet formation along paths substantially parallel with the sheet being drawn from a point opposite the approximate center line of said sheet toward its opposite edges, maintaining said streams by blowing jets of air thereinto at spaced intervals across the width of the sheet and at an angle away from the center line of the sheet, and controlling the temperature of the air in said jets and the temperature of said air streams along said paths.

11. A method of producing sheet glass comprising, drawing a ribbon or sheet from a bath of molten glass through a zone of sheet formation, setting up substantially confined streams of relatively cool blown air of definite width blanketing a portion of the sheet and traveling across the sheet through the zone of sheet formation along paths substantially parallel with the sheet being drawn from a point opposite the approximate center line of said sheet toward its opposite edges, maintaining said streams by blowing jets of air thereinto at spaced intervals across the width of the sheet and at an angle away from the center line of the sheet, and improving the uniformity of the cooling action of said streams by constantly shifting the position of said jets of air to break up any spot or line cooling pattern resulting therefrom.

DONALD E. SHARP.

REFERENCES CITED

The following references are of record in the file of this patent:

UNITED STATES PATENTS

| Number | Name | Date |
| --- | --- | --- |
| 1,015,404 | Schewczik | Jan. 23, 1912 |
| 1,764,758 | Slining | June 17, 1930 |
| 1,841,548 | Nobbe | Jan. 19, 1932 |
| 2,125,914 | Haight | Aug. 9, 1938 |
| 2,158,669 | Amsler | May 16, 1939 |
| 2,201,286 | Bundy | May 21, 1940 |
| 2,246,053 | Magrini | June 17, 1941 |
| 2,278,328 | Magrini | Mar. 31, 1942 |
| 2,287,136 | Rolland et al. | June 23, 1942 |
| 2,352,539 | Halbach et al. | June 27, 1944 |

FOREIGN PATENTS

| Number | Country | Date |
| --- | --- | --- |
| 194,140 | Switzerland | Apr. 16, 1938 |